United States Patent Office 3,278,312
Patented Oct. 11, 1966

3,278,312
METHOD OF PRODUCING A YEAST-STARCH COMPOSITION
Henri Griffon and Georges Tixier, Paris, France, assignors to Laboratoires Millot, Paris, France, a corporation of France
No Drawing. Filed July 30, 1963, Ser. No. 298,573
2 Claims. (Cl. 99—96)

This application is a continuation-in-part of our copending application Serial No. 136,190, filed September 6, 1961, and now abandoned.

The present invention relates to a novel yeast composition and to its preparation and more particularly to a yeast-starch composition prepared in such manner as to maximize the number of living yeast cells therein.

Yeast-starch compositions as ordinarily made from fresh pressed yeast contain only about 30 to 40 percent of living yeast cells. This is due to the fact that living yeast cells are extremely sensitive to heat and mechanical working with the result that the conditions of preparation kill a large percentage of the living yeast cells. This is particularly true where the fresh yeast and starch are worked into a firm paste which is mechanically kneaded as mechanical and thermal shock are particularly apt to kill a large proportion of the living yeast cells. This is contributed to, moreover, by lack of careful control of dessication or to the use of a current of drying air which is at an excessive temperature. For example, fresh pressed yeast of 71 percent moisture content contains approximately ten billion nine hundred million living cells per gram. In reducing the moisture content to about 8 percent and using ordinary kneading procedures, it has been found that there are only four billion four hundred fifty million living cells remaining amounting to about 40 percent of the total number of cells per gram. Similarly, when reducing the moisture content to 9 percent, the other conditions being the same, it has been found that there were only three billion six hundred million living cells amounting to 33.5 percent of the total number of cells per gram. Microscopic observation of yeast cells colored according to the method of Funk and Kulhes which colors the dead yeast cells blue without coloring the live cells, shows that the dead yeast cells were not appreciably altered morphologically as compared with the living yeast cells, but intensive study shows that a number of cells has undergone under the mechanical pressure of kneading an expulsion of a relatively large proportion of the cellular contents which has escaped through an orifice formed generally at one of the poles of the ellipsoid of revolution represented by the yeast cells, such orifice corresponding to the site where the cell is separated from the mother cell which has given birth to it and this site remaining as a small scar region of decreased resistance. Consequently, yeast-starch compositions made in the aforementioned manner have commercial as well as dietetic and therapeutic disadvantages. Such a yeast-starch composition lacks good activity and otherwise constitutes a relatively ineffective composition even for breadmaking purposes.

It has now been discovered that by modifying the foregoing procedure a yeast-starch composition can be produced wherein the percentage of living yeast cells ranges from 60 to 80 percent with consequent advantages accruing therefrom in the commercial and therapeutic use and application of such composition. In general, it has been found that by diluting the yeast prior to mixing it with the starch and by forming a relatively liquid creamy suspension instead of a firm or stiff paste, relatively few living yeast cells are killed during processing. For example, in reducing the moisture content to 9 percent there were seven billion five hundred fifty million living yeast cells per gram, amounting to 70 percent of the total number of yeast cells per gram. Similarly, when reducing the moisture content to 8 percent, the number of living cells was found to be seven billion two hundred million, amounting to 65.5 percent of the total number of yeast cells per gram. The present invention, therefore, may be said to maximize the proportion of living yeast cells so that a much better and more active yeast-starch composition is obtained. In accordance with the present invention elevated pressures and other conditions which are unfavorable are largely avoided and the starch is dispersed in the yeast after having diluted the yeast with water and thereafter adding the starch in incremental portions while agitating the mixture until it becomes a soft homogeneous paste which is readily mechanically kneaded without subjecting the yeast cells to adverse mechanical or thermal shock. This mixture can then be readily granulated and the granules dessicated to the desired moisture content which is preferably about 8 to 10 percent. The resulting product contains 60 to 80 percent of living yeast cells.

In carrying out the present method and by way of non-limitative example, 30 liters of pure water are introduced into a suitable mixer which is then put into operation and 100 kilograms of yeast introduced into the operating mixer which is continued in operation until a homogeneous paste is obtained. A predetermined quantity of starch is then weighed out and added incrementally to the yeast paste and the mixing operation continued until all the starch has been added and until a new homogeneous paste is produced. This paste is then granulated with the aid of a conventional granulating machine having a 3 millimeter mesh screen. The granulation is then separated out in a thin layer on dry plates and while on these plates introduced into a chamber which is either air conditioned or which has an inert gas atmosphere. At no time is the temperature allowed to exceed 37° C. Dehydration takes place in the chamber and is watched at regular intervals of about four hours until the moisture content of the product is between 8 and 15 percent, preferably about 8 to 10 percent. The product obtained is in the form of a pulverulent substance of clear beige color and is put into hermetically sealed receptacles protected against heat and humidity. The product may, for example, be divided into gelules of 0.50 gram each.

In determining the quantity of starch to be added, the following table is employed:

TABLE 1

| Percent moisture content: | Amount of starch to be used, kg. |
|---|---|
| 13 | 66.6 |
| 14 | 67.4 |
| 15 | 68.2 |
| 16 | 69.0 |
| 17 | 69.8 |
| 18 | 70.7 |
| 19 | 71.6 |
| 20 | 72.2 |

Where the moisture content is above or below that in the foregoing table, a graph can be made and extrapolated at either end for other moisture contents.

The effect of compression on the proportion of living yeast cells such as involved in the manufacture of compressed tablets is clearly shown by the following table:

TABLE 2

| Compression in kg. per square centimeter | Thickness of the Compressed Tablets in Millimeters | Number of Cells per Gram (in millions) | | | |
|---|---|---|---|---|---|
| | | Total Number of Cells | Number of Living Cells | Number of Dead Cells | Percentage of Living Cells |
| 0 | ------ | 10,000 | 4,400 | 5,250 | 44.0 |
| 800 | 7.4 | 10,000 | 4,000 | 6,000 | 44.0 |
| 1,000 | 7.1 | 10,000 | 4,000 | 6,000 | 44.0 |
| 1,200 | 6.9 | 10,000 | 3,500 | 6,250 | 35.0 |
| 1,400 | 6.6 | 9,000 | 2,500 | 6,350 | 28.0 |
| 1,600 | 6.3 | 8,800 | 1,800 | 7,000 | 20.5 |
| 1,800 | 5.9 | 8,350 | 700 | 7,650 | 8.4 |
| 2,100 | 5.7 | 8,180 | 360 | 7,820 | 4.4 |
| 2,600 | 5.4 | 8,000 | 260 | 7,740 | 3.25 |
| 2,800 | 5.2 | 8,000 | 0 | 8,000 | 0 |
| 3,300 | 5.2 | 7,250 | 0 | 7,250 | 0 |
| 4,000 | 5.2 | 7,250 | 0 | 7,250 | 0 |

It will be observed from Table 2 that the percentage of living yeast cells falls off rather rapidly with increasing pressures, and above 2600 kilograms per square centimeter all yeast cells are killed and even at relatively light pressure the percentage of living cells is little more than 40 percent. While in accordance with the present invention the yeast cells are not subjected to such high pressures or to compressions resulting from tableting, nevertheless the table is highly indicative of the sensitivity of yeast cells to pressure and to mechanical shock.

The invention therefore comprises the production of yeast compositions by a technique which avoids pressures unfavorable to the continued existence of live yeast cells and uses only procedure which kills a relatively small proportion of the five yeast cells present in fresh pressed yeast. The product produced by the present invention is particularly useful not only in the manufacture of bread and the fermentation of beer, but also for its favorable action on intestinal flora and for the treatment of gastointestinal conditions as well as nutritional values of its vitamins and proteins. Surprisingly, the new yeast product keeps well even in the absence of refrigeration and does not die, grow or putrify and yet is in a condition in which it becomes immediately fully active when used for commercial and pharmaceutical purposes in contact with moisture or fluids which causes its hydration. The product is also in substantial hygroscopic equilibrium with the atmosphere which constitutes an important advantage in that there is little or no tendency for the new yeast product to pick up moisture from the atmosphere or to lose moisture to the atmosphere. Any suitable powdered starch can be used for admixture with the yeast such as corn starch, rice starch, potato starch or cereal starch. In this way, it is possible to make an unusually homogeneous admixture or dispersion. In addition to its nutritive and other biological properties, the new yeast product is non-irritating to human and animal intestines and has a gentle aperient and carminative action. As to yeast cells which are killed during processing, the morphology and organoleptic properties are retained.

What is claimed is:

1. A method of producing a yeast-starch composition containing 60 to 80 percent of living yeast cells which comprises mixing water and yeast in the relative proportions of 30 liters of water to 100 kilograms of yeast, mixing the water and yeast until a creamy homogeneous paste is obtained, adding a predetermined quantity of starch thereto in incremental manner while continuing the mixing until a homogeneous paste is obtained, granulating the last-named paste and desiccating the resulting granules at a temperature not exceeding 37° C. until the moisture content is in the range of 8 to 15 percent.

2. A method in accordance with claim 1, in which the amount of starch added is directly related to moisture content and is present in an amount related to the moisture content substantially as follows:

| Percent moisture: | Kg. starch |
|---|---|
| 8 | 62.6 |
| 9 | 63.4 |
| 10 | 64.2 |
| 11 | 65.0 |
| 12 | 65.8 |
| 13 | 66.6 |
| 14 | 67.4 |
| 15 | 68.2 |

References Cited by the Examiner

UNITED STATES PATENTS

| 1,039,999 | 10/1912 | Ohlhaver | 99—96 |
| 1,306,569 | 6/1919 | Whitney | 99—96 |
| 1,386,360 | 8/1921 | Penniman | 99—96 |
| 1,420,557 | 6/1922 | Klein | 99—96 |
| 1,706,564 | 3/1929 | Dawson | 99—96 |
| 3,089,774 | 5/1963 | Sumner et al. | 99—96 |

A. LOUIS MONACELL, *Primary Examiner.*

D. M. STEPHENS, *Assistant Examiner.*